(12) United States Patent
Aguiar et al.

(10) Patent No.: US 10,824,811 B2
(45) Date of Patent: Nov. 3, 2020

(54) MACHINE LEARNING DATA EXTRACTION ALGORITHMS

(71) Applicant: SAP SE, Walldorf (DE)

(72) Inventors: Everaldo Aguiar, Bellevue, WA (US); Jesper Lind, Bellevue, WA (US)

(73) Assignee: SAP SE, Walldorf (DE)

( * ) Notice: Subject to any disclaimer, the term of this patent is extended or adjusted under 35 U.S.C. 154(b) by 54 days.

(21) Appl. No.: 16/156,636

(22) Filed: Oct. 10, 2018

(65) Prior Publication Data

US 2020/0042591 A1 Feb. 6, 2020

Related U.S. Application Data

(60) Provisional application No. 62/713,198, filed on Aug. 1, 2018.

(51) Int. Cl.
*G06F 40/295* (2020.01)
*G06K 9/46* (2006.01)

(52) U.S. Cl.
CPC ............ *G06F 40/295* (2020.01); *G06K 9/46* (2013.01); *G06K 2209/01* (2013.01)

(58) Field of Classification Search
CPC ........ G06F 40/00; G06F 40/10; G06F 40/295; G06K 9/46
See application file for complete search history.

(56) References Cited

U.S. PATENT DOCUMENTS

| 8,095,530 | B1* | 1/2012 | Lloyd | G06F 7/02 707/709 |
| 8,953,885 | B1* | 2/2015 | Och | G06K 9/50 382/177 |
| 10,417,788 | B2 | 9/2019 | Risman et al. | |
| 10,650,230 | B2 | 5/2020 | Johnson | |
| 2007/0065003 | A1 | 3/2007 | Kellerman et al. | |
| 2011/0211759 | A1 | 9/2011 | Park et al. | |
| 2014/0023273 | A1* | 1/2014 | Baheti | G06K 9/72 382/177 |
| 2015/0339525 | A1* | 11/2015 | Marcelli | G06K 9/723 382/161 |
| 2017/0109573 | A1* | 4/2017 | Collet | G06K 9/00422 |

(Continued)

OTHER PUBLICATIONS

Dzmitry Bahdanau et al, "Neural Machine Translation by Jointly Learning to Align and Translate," in ICLR 2015, May 19, 2016, 12 pages.

(Continued)

*Primary Examiner* — Paras D Shah
(74) *Attorney, Agent, or Firm* — Fountainhead Law Group P.C.

(57) ABSTRACT

Embodiments of the present disclosure pertain to extracting data corresponding to particular data types using machine learning algorithms. In one embodiment, a method includes receiving an image in a backend system, sending the image to an optical character recognition (OCR) component, and in accordance therewith, receiving a plurality of characters recognized in the image. The character set is matched against known values to generate candidate character strings. The character set is processed by one or more machine learning algorithms to produce features. For each candidate character string, the features are then processed by a random forest model to determine a final character string.

20 Claims, 5 Drawing Sheets

(56) References Cited

U.S. PATENT DOCUMENTS

| | | | |
|---|---|---|---|
| 2018/0025256 A1* | 1/2018 | Bai | G06K 9/62 |
| | | | 382/229 |
| 2019/0130213 A1 | 5/2019 | Shazeer et al. | |
| 2019/0130578 A1 | 5/2019 | Gulsun et al. | |
| 2019/0147304 A1 | 5/2019 | Liu et al. | |
| 2019/0266474 A1 | 8/2019 | Stark et al. | |
| 2019/0279035 A1 | 9/2019 | Bluche | |
| 2019/0385001 A1* | 12/2019 | Stark | G06K 9/74 |

OTHER PUBLICATIONS

Ilya Sutskever et al, "Sequence to Sequence Learning with Neural Networks," Dec. 14, 2014, 9 pages.

Jiang Wang et al, "CNN-RNN: A Unified Framework for Multi-label Image Classification," Cornell University Library, Apr. 15, 2016, 10 pages.

Yuntian Deng et , "Image-to-Markup Generation with Coarse-to-Fine Attention," Proceedings of the 34th International Conference on Machine Learning, Jun. 13, 2017, Sydney, Australia, 10 pages.

Andrej Karpathy et al., Deep Visual-Semantic Alignments for Generating Image Descriptions,CVPR 2015 Conference, Jun. 8-12, 2015, 17 pages.

Yann Lecun et al, "Convolutional Networks for Images, Speech, and Time-Series," Handbook of Brain Theory and Neural Networks. MIT Press, published Jun. 1995, 14 pages.

Related Unpublished U.S. Appl. No. 16/880,616, filed May 21, 2020.

* cited by examiner

MACHINE LEARNING DATA EXTRACTION ALGORITHMS

BACKGROUND

The present disclosure relates to data extraction, and in particular, to systems and methods for extracting data using machine learning algorithms.

The proliferation of cameras and other electronic image capture devices has led to massive growth in the availability of images. For example, cameras can be found on almost all mobile devices, and such ready access to a camera allows users to capture an ever increasing amount of electronic images. Interestingly, images often contain data, and such data can be useful for a wide range of applications. However, extracting data from an image is no simple task. For example, an image of a receipt may include different data types about a variety of topics, including location information, vendor information, and the like. However, accurately extracting types of data from the image is challenging. Accordingly, it would be advantageous to discover improved techniques for extracting data from electronic images.

SUMMARY

Embodiments of the present disclosure pertain to extracting data corresponding to particular data types using machine learning algorithms. In one embodiment, a method includes receiving an image in a backend system, sending the image to an optical character recognition (OCR) component, and in accordance therewith, receiving a plurality of characters recognized in the image. The character set is matched against known values to generate candidate character strings. The character set is processed by one or more machine learning algorithms to produce features. For each candidate character string, the features are then processed by a random forest model to determine a final character string.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Figure 1:
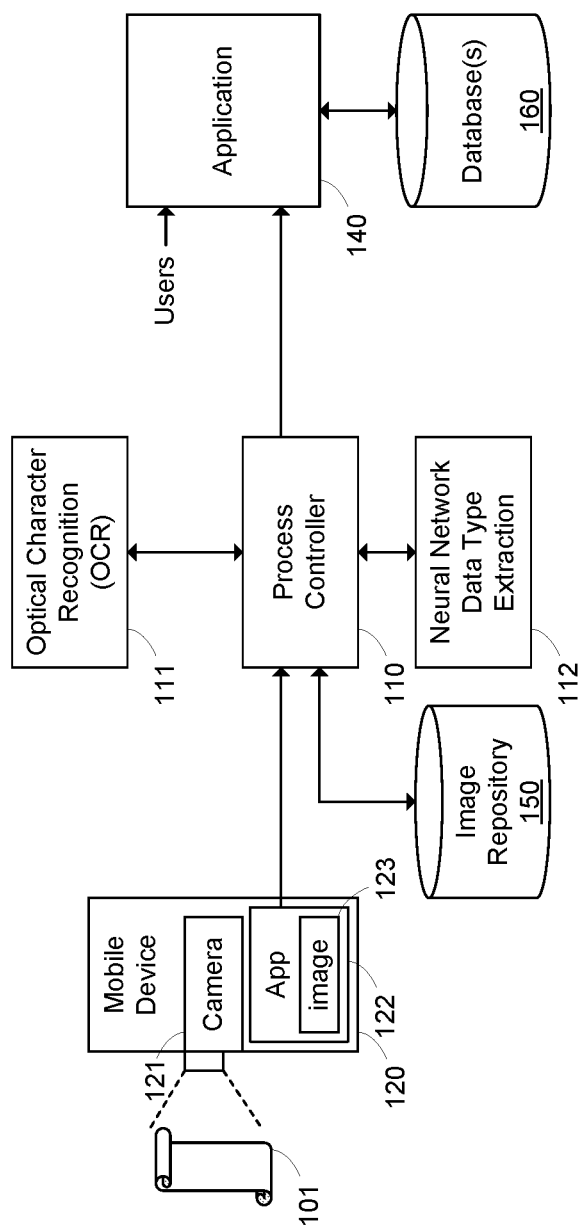
FIG. 1 illustrates an architecture for extracting data from an image according to one embodiment.

FIG. 1 illustrates an example architecture for extracting data from an image according to one embodiment. As used herein, an "image" refers to an electronic image, which may include electronic photographs or pictures stored in one of a variety of digital formats, for example. As illustrated in FIG. 1, a mobile device 120 may include a camera 121. Camera 121 may be used to take a picture and create an image 123, which may be stored on mobile device 120. The following description uses an example image of a receipt 101 captured on a mobile device 120 to describe various aspects of the disclosure. However, it is to be understood that this is not the only embodiment that may use the features and techniques described herein. In this example, mobile device 120 includes an application 122 (aka "App"), which, when accessed, automatically accesses the camera. In one embodiment, the App may be an "Expense App" that includes functionality for accessing the camera to take a picture of a receipt and sending the image to a backend system, for example.

In this example, the image 123 is sent to a backend software system that includes functionality for extracting data corresponding to particular data types (or patterns) from the image. The backend software system may include a process controller component 110, an optical character recognition (OCR) component 111, image repository 150, a neural network data type extraction component 112, an application 140, and one or more databases 160. In this example, process controller 110 may receive images from App 123, via email, or through a variety of other image transfer mechanisms (e.g., text, links, etc. . . . ). Process controller 110 may control storing images in repository 150, sending images to OCR component 111, sending characters from the OCR to extraction component 112, and forward extracted data to application 140 and database 160, which process and store the data, respectively, so users can interact with the data through application 140, for example. In one embodiment, the image is a receipt, and the application is an Expense Application, for example. Process controller 110 may send an image to OCR component 111, and the OCR component 111 may return characters from the image, for example. Neural network data type extraction component 112 may extract blocks of contiguous characters from the returned OCR character set that have a particular data type (or data pattern), such as a location name, vendor name, or the like, for example. The output characters extracted from the image are then stored in application 140 and/or database 160.

Figure 2:
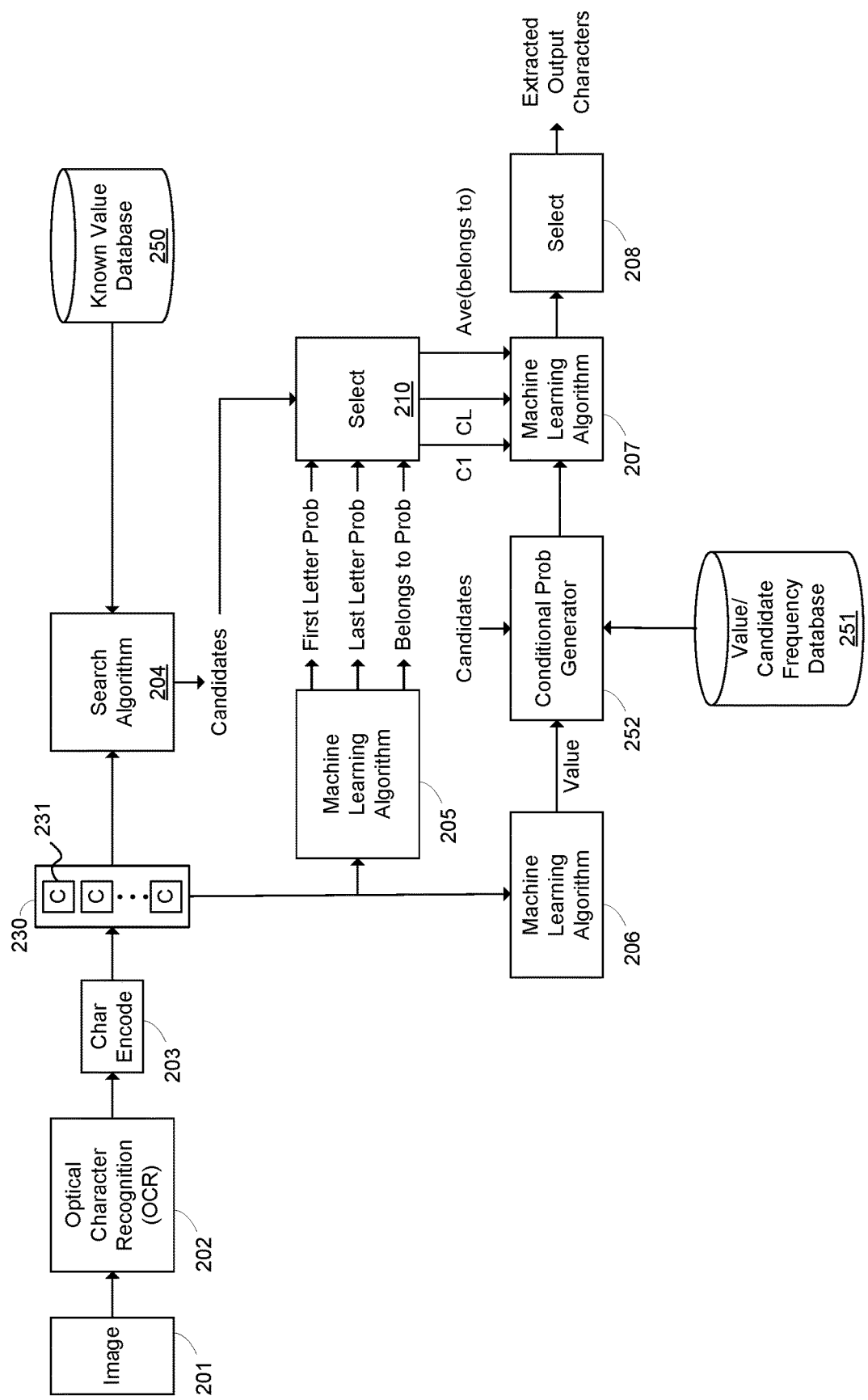
FIG. 2 illustrates an architecture of a neural network for extracting types of data according to one embodiment.

FIG. 2 illustrates data extraction according to one embodiment. In this example, an image 201 is processed by an optical character recognition system (OCR) or other image to character based system, for example. The output may comprise encoded characters 203, for example. Characters 231 in a character set 230 may be represented in a variety of ways in a computer system. The characters 231 in character set 230 may be converted from the encoding produced by OCR 202 to a number of different representations useful for processing as disclosed herein.

In one embodiment, known values of a type of data to be extracted may be stored in a known value database 250. The known values may be received in a search algorithm 204. The characters 231 in the character set 230 are received and processed by the search algorithm to produce candidate character sets. For example, if the known values are city names, the candidate character sets may be "SEATTLE," "CHICAGO," etc. . . . . In one embodiment, algorithm 204 outputs a plurality of tuples comprising characters in the candidate character string and indexes to said characters in the character set (e.g., "T": index to "T" in set 231). The plurality of tuples may include at least one tuple specifying a first location, in the character set, of a first character of each candidate character string matching one of the known values (e.g., "S": index) and at least one tuple specifying a second location, in the character set, of a last character of each candidate character string matching one of the known values (e.g., "O": index).

Features and advantages of the present disclosure include determining a candidate character set based on known values and then selecting one of the candidate sets based on other probabilities produced from the character set 230 using machine learning algorithms. For example, one or more machine learning algorithms 205 may receive character set 231 for image 201 and produce a plurality of probabilities (e.g., two or more probabilities for each character in the character set). The plurality of probabilities may comprise probabilities that each character in the character set is a first character of one of the known values. Additionally, the probabilities generated by a machine learning algorithm may be probabilities that each character in the character set is a last character of one of the known values. For example, a machine learning algorithm may be trained using known values and a volume of character sets derived from images (e.g., such as receipts). Accordingly, a machine learning algorithm may be able to determine a probability that particular characters in any character set are a first character of a known value and a probability that particular characters in any character set are a last character of a known value, for example. In some embodiments, a machine learning algorithm may further produce a probability that particular characters in any character set "belong to" one of the known values (e.g., a probability that an "L" in a character set belongs to the word "SEATTLE"). Machine learning algorithm 205 may be implemented in a variety of ways. In one embodiment, one machine learning algorithm may be used to generate multiple probabilities, while in other embodiments individual machine learning algorithms may be used to generate different probabilities, for example.

Candidate character strings from algorithm 204 may be combined with probabilities from machine learning algorithm(s) 205 to select the characters corresponding to the candidate character string having the highest likelihood as the final character string. For example, probabilities for each character in the character set may be matched up against the indices for the candidate character strings from 204. For instance, using the indices for a candidate character string "CHICAGO" corresponding probabilities may be found for each character in the candidate character string—e.g., C=0.9/0.1, H=0.1/0.1, . . . , O=0.1/0.9, where the first probability is a probability that the character is a first character and the second probability is a probability that the character is a last character. Once the probabilities from machine learning algorithm(s) 205 are matched to candidate character strings, then, for each candidate character string, the probability of the character being the first character of one of the known values and the probability of the character being the last character of one of the known values may be provided as input features to a second machine learning algorithm 207 to produce a plurality of likelihoods corresponding to the candidate character strings. As mentioned above, in one embodiment, a probability that input characters "belong to" a candidate character string may also be provided as an input.

In one example embodiment, an additional machine learning algorithm 206 may receive the input character set and generate another input feature. Embodiments of the present disclosure may obtain more accurate output results by processing the character set using different algorithms to generate input features of a machine learning algorithm 207, for example. In one embodiment, machine learning algorithm 206 is trained to receive the character set and product a value, which may relate to the character set as a whole (e.g., a country a receipt is from). In one embodiment, the value may be combined with frequency data in database 251 and candidate character strings from algorithm 204 to produce a conditional probability at 252 that each candidate character string is related to the value, such as given a value X from algorithm 206, the probability of a correct candidate character string Y (e.g., a conditional probability that if value is USA that SEATTLE is the correct candidate string or if the value is FRANCE that SEATTLE is the correct candidate string). Accordingly, as illustrated in the example shown in FIG. 2, determining a conditional probability for each candidate character string may include processing the input character set 230 using machine learning algorithm 206 to product a list of one or more second values and corresponding probabilities that the second values are related to the input character set and determining said conditional probability for each candidate character string based on conditional probabilities, frequency data corresponding to observed occurrences of each candidate character string and the one or more values from algorithm 206, and the candidate character strings from algorithm 204, for example. In one embodiment, machine learning algorithm 208 may be trained to produce the known values based on the input probabilities of the first letter, last character, and belongs to, for example. Finally, the characters corresponding to the candidate character string having the highest likelihood are selected at 208 as the final character string.

The techniques described herein may be used in a variety of applications. In one example embodiment, the known values and final character string are city names extracted from an image of a receipt. In another example embodiment, the known values and final character string are vendor names extracted from an image of a receipt.

Figure 3:
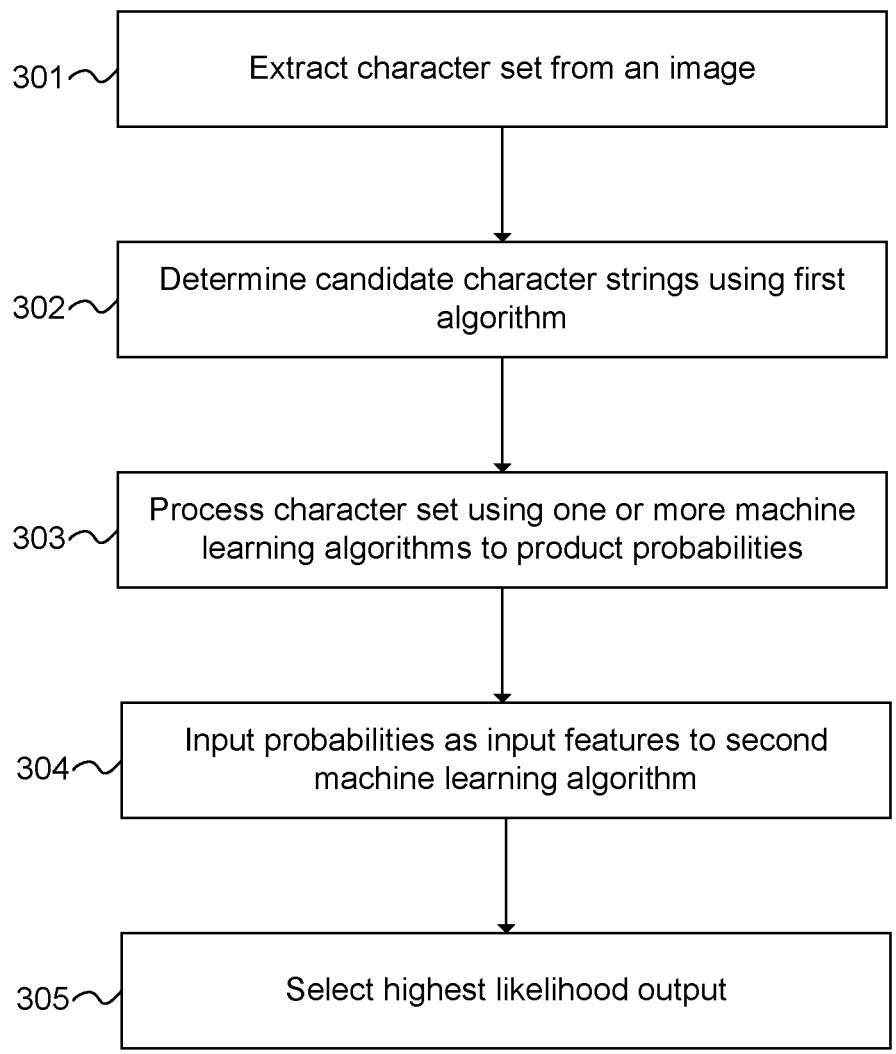
FIG. 3 illustrates method according to one embodiment.

FIG. 3 illustrates a method according to an embodiment. At 301, a character set may be extracted from an image (e.g., using OCR). At 302, candidate character strings may be determined from the character set using a first algorithm, such as a search algorithm, for example, that matches characters in the character set with known values of a type of data to be extracted (e.g., city names or vendor names), which may be stored in a database, for example. At 303, the character set is processed using one or more machine learning algorithms to produce a plurality of probabilities. The plurality of probabilities may include probabilities that each character in the character set is a first character of one of the known values and probabilities that each character in the character set is a last character of one of the known values, for example. The probabilities may further include probabilities that each character belongs to a candidate character string, for example. In one embodiment, a conditional probability may be generated based on a value corresponding to the entire character set and frequency data indicating a number of times the value is observed with known values, for example. The probabilities may be used as input features to another machine learning algorithm at 304, which produces a plurality of likelihoods corresponding to the candidate character strings. At 305, the characters corresponding to the candidate character string having the highest likelihood are selected as the final character string.

Figure 4:
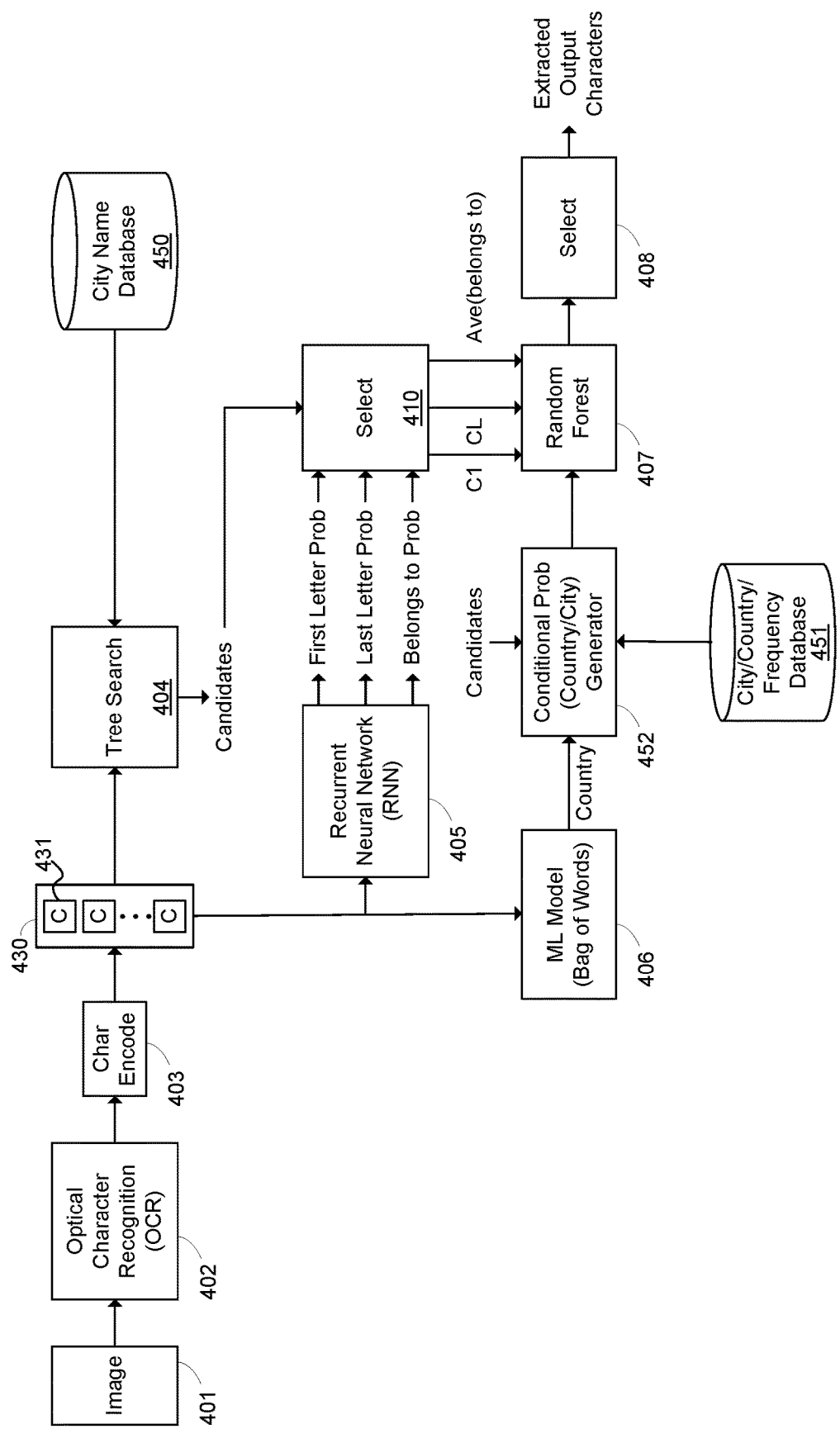
FIG. 4 illustrates an example architecture of a neural network for extracting types of data according to one embodiment.

FIG. 4 illustrates an example architecture of a system for extracting types of data. The following disclosure illustrates an embodiment for extracting city names from character sets. It is to be understood that the same technique could be applied to extracting other types of information, such as vendor names, for example.

Features and advantages of the present disclosure include storing known values for a particular type, such as a city, and using the known values to determine candidates. Then, the characters are processed using a neural network (e.g., a recurrent neural network) to determine probabilities that each character in the character set is part of a candidate. The known candidates are then combined with the probabilities to produce features that can be entered into a machine learning model to produce a ranking of the candidates.

In this example, city names may be stored in a database 450. The city names may be stored in a search tree data structure 404, for example, such as an Aho-Corasick trie structure, where a trie is a type of search tree which may comprise an ordered tree data structure that may store a dynamic set or associative array where the keys may be strings, for example. The characters in the character set may then be searched to produce candidates. Tree search 404 may output tuples of indexes to characters in the character set with a location of a first character of a candidate word matching the known city names ("C" in "Chicago") and a location of a last character of a candidate word matching a known city name ("O" in "Chicago"). The search tree 404 may find and extract multiple candidate cities. Accordingly, each character set 430 may result in multiple candidate matches, for example.

The character set may further be processed using recurrent neural network (RNN) 405. RNN 405 may produce probabilities for each character in the character set. For example, RNN 405 may output probabilities that each character is a first character in a known city name ("First Letter Prob"). RNN 405 may output probabilities that each character is a last character in a known city name ("Last Letter Prob"). Finally, RNN 405 may output probabilities that each character belongs to a known city name ("Belongs to Prob").

The various probabilities for each character in the character set may then be matched up against the indices for the candidates from the tree search 404 using the indices from tree search 404 as illustrated by select block 410, for example. As one example candidate characters, the characters "SEATTLE" may produce the following probabilities in Table 1:

TABLE 1

| Char | S | E | A | T | T | L | E |
|---|---|---|---|---|---|---|---|
| First | .8 | .2 | .1 | .1 | .1 | .1 | .1 |
| Last | .1 | .1 | .1 | .1 | .1 | .2 | .9 |
| Belongs to | .9 | .85 | .75 | .9 | .85 | .9 | .8 |

Similar probabilities may be generated for other characters in the candidate set of city names from tree search 404, for example.

For each candidate word from tree search 404, a probability of the first character (C1), a probability of the last character (CL), and an average of the "Belongs to" probabilities ("Ave(belongs to)") may be obtained and used as features input to another machine learning algorithm 407.

Additionally, the character set 430 may be input to a machine learning algorithm 406 (e.g., "Bag of Words"). ML model 406 may receive the OCR text 430 and predict the country a particular receipt is most likely to be from. In this example, a bag of words model 406 takes as input the character set 430 and produces as output a list of (one or more) countries and the corresponding probabilities that these are the country of origin for that receipt. Such pairings may look like {"France": 0.9, "United States": 0.05, "Canada":0.05}. This output is then combined with information extracted from a database 451, which stores previous observations of <city,country> pairs. In another example embodiment, the system extracts vendor names, and the country may be predicted from the OCR text by applying ML model 406. The resulting information may be used to generate the paired conditional probabilities <vendor,country>, for example. In one example embodiment, database 451 may store a frequency that particular cities/country pairs (or vendor/country pairs) are observed. Conditional probability generator 452 receives the output of the bag of words, city/country pair frequencies from database 451, and the candidates from tree search 404 to produce, for each candidate extracted by 404, a conditional probability that indicates how likely each candidate is of being correct given the predicted country (country with highest probability). The following is one example:

Candidates extracted by 404: Chicago, Paris, Kirkland

Predicted country by 406: {"France": 0.9, "United States": 0.05, "Canada":0.05}

Observed occurrences of these candidates in X (e.g., information from database 451): <Chicago, US>: 50,000, <Paris, US>: 200, <Paris, FR>: 10,000, <Kirkland, US>: 20,000.

These two feeds are then combined to generate the conditional probability (Country/City), which in this case may look like: <Paris, FR>0.98, <Chicago, US>: 0.1, <Kirkland, US>0.04, <Paris, US>: 0.01.

For example, the conditional probability is, given a country X (e.g., France), the probability of a correct city name Y (e.g., Paris).

For each candidate word in the candidate set from tree search 404, the conditional probability, the probability of the first character (C1), the probability of the last character (CL), and the average of the probabilities the characters belong to the candidate word are input to machine learning algorithm 407, which in this example is a Random Forest model. Random Forest model 407 may output a ranking of each candidate from the tree search 404 together with a likelihood that the candidate is the correct city name. The candidate with the highest likelihood may be selected at 408 as the final output, and the characters may be extracted from the character set using the index values produced by tree search 404, for example.

EXAMPLE HARDWARE

Figure 5:
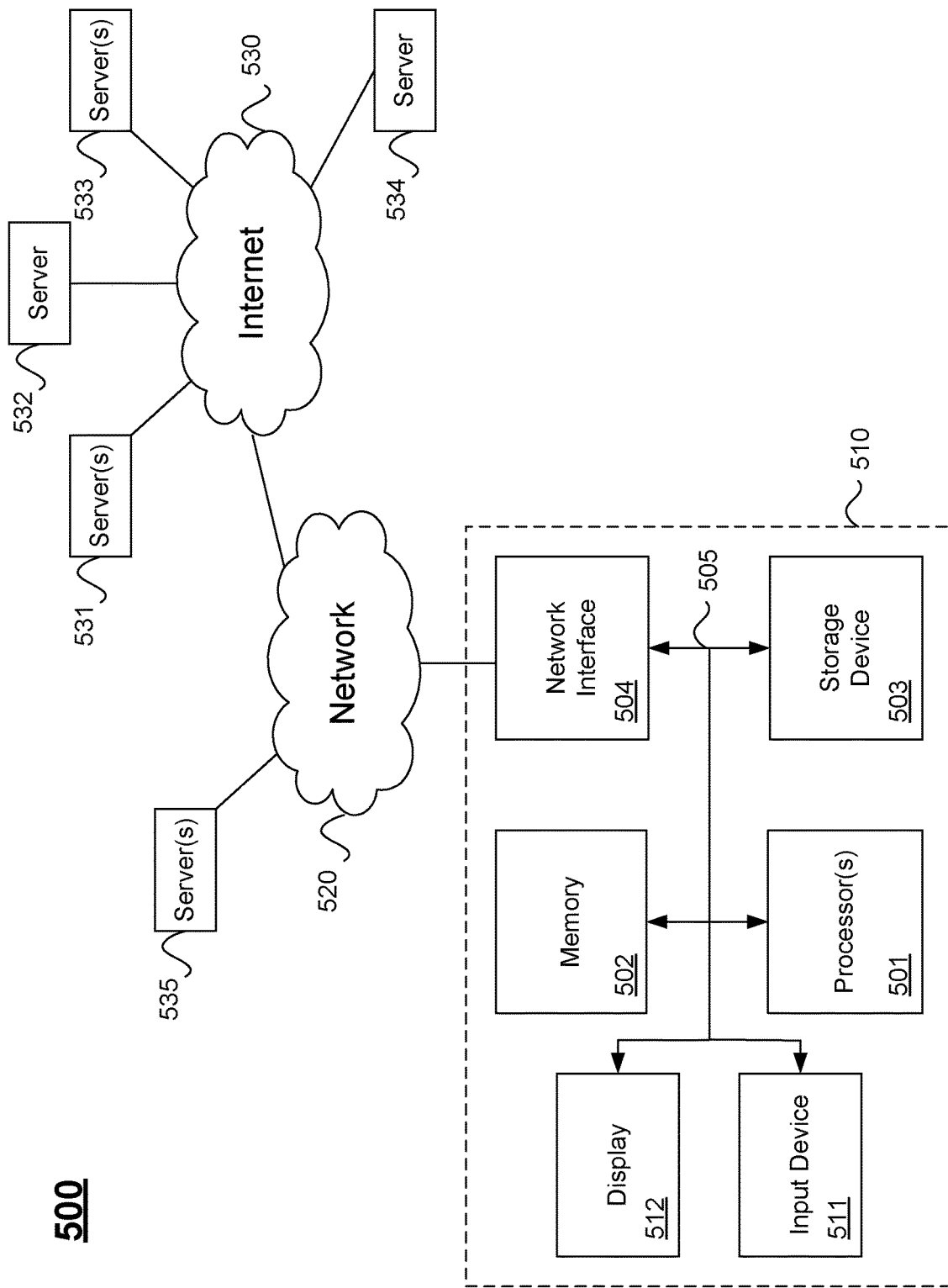
FIG. 5 illustrates computer system hardware configured according to the above disclosure.

FIG. 5 illustrates computer system hardware configured according to the above disclosure. The following hardware description is merely one illustrative example. It is to be understood that a variety of computers topologies may be used to implement the above described techniques. An example computer system 510 is illustrated in FIG. 5. Computer system 510 includes a bus 505 or other communication mechanism for communicating information, and one or more processor(s) 501 coupled with bus 505 for processing information. Computer system 510 also includes a memory 502 coupled to bus 505 for storing information and instructions to be executed by processor 501. Memory 502 may also be used for storing programs executed by processor(s) 501. Possible implementations of memory 502 may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 503 may include source code, binary code, or software files for performing the techniques above, for example. Storage device 503 and memory 502 are both examples of non-transitory computer readable storage mediums.

Computer system 510 may be coupled via bus 505 to a display 512 for displaying information to a computer user. An input device 511 such as a keyboard, touchscreen, mouse and/or camera is coupled to bus 505 for communicating information and command selections from the user to processor 501. The combination of these components allows the user to communicate information with the system. In some systems, bus 505 represents multiple specialized buses for coupling various components of the computer together, for example.

Computer system 510 also includes a network interface 504 coupled with bus 505. Network interface 504 may provide two-way data communication between computer system 510 and a local network 520. Network 520 may represent one or multiple networking technologies, such as Ethernet, local wireless networks (e.g., WiFi), or cellular networks, for example. The network interface 504 may be a wireless or wired connection, for example. Computer system 510 can send and receive information through the network interface 504 across a wired or wireless local area network, an Intranet, or a cellular network to the Internet 530, for example. In some embodiments, a browser or local application, for example, may access data and features on backend software systems that may reside on multiple different hardware servers on-prem 535 or across the Internet 530 on servers 531-534. One or more of servers 531-534 may also reside in a cloud computing environment, for example. Such servers may also comprise hardware such as memory, one or more processors, storage devices, and a network interface similar to computer 510, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer implemented method comprising:
    storing known values of a type of data to be extracted, wherein the known values comprise words, wherein each word comprising a plurality of characters;
    receiving a character set;
    determining a plurality of candidate character strings from the character set based on the known values using a first algorithm;
    processing the character set using one or more first machine learning algorithms to produce a plurality of probabilities, the plurality of probabilities comprising probabilities that each character in the character set is a first character of one of the known values and probabilities that each character in the character set is a last character of one of the known values;
    for each candidate character string, processing said probabilities that each character in the character set is a first character of one of the known values and said probabilities that each character in the character set is a last character of one of the known values as input features to a second machine learning algorithm to produce a plurality of likelihoods corresponding to the candidate character strings; and
    selecting the characters corresponding to the candidate character string having the highest likelihood as the final character string.

2. The method of claim 1 wherein the first algorithm outputs a plurality of tuples comprising characters in the candidate character string and indexes to said characters in the character set, the plurality of tuples including at least one tuple specifying a first location, in the character set, of a first character of each candidate character string matching one of the known values and at least one tuple specifying a second location, in the character set, of a last character of each candidate character string matching one of the known values.

3. The method of claim 1 wherein the known values and final character string are city names.

4. The method of claim 1 wherein the known values and final character string are vendor names.

5. The method of claim 1 wherein the first algorithm is a search algorithm receiving the character set and a plurality of known word values stored in a database and producing the candidate character strings.

6. The method of claim 5 wherein the search algorithm comprises a Aho-Corasick trie structure configured with the plurality of known word values.

7. The method of claim 1 wherein the one or more first machine learning algorithms comprise one or more recurrent neural networks.

8. The method of claim 1 wherein the second machine learning algorithm comprises a random forest algorithm.

9. The method of claim 1 wherein the plurality of probabilities further comprising probabilities that each character in the character set belongs to one of the known values, the method further comprising
    for each candidate character string, determining an average probability that the characters belong to one of the known values; and
    processing the average probability that the characters belong to one of the known values as one of said input features to the second machine learning algorithm to produce said plurality of likelihoods for each candidate character string.

10. The method of claim 1 further comprising:
    determining a conditional probability for each candidate character string, wherein the conditional probability corresponds to a likelihood of a particular candidate character string being a correct character string given a particular second value related to the character set as a whole; and
    for each candidate character string, processing the conditional probability for each candidate character string as one of said input features to the second machine learning algorithm to produce said plurality of likelihoods for each candidate character string.

11. The method of claim 10 wherein determining said conditional probability for each candidate character string comprises:
- processing the character set using a third machine learning algorithm to produce a list of one or more second values and corresponding probabilities that the second values are related to the character set;
- receiving frequency data corresponding to observed occurrences of each candidate character string and the one or more second values;
- determining said conditional probability for each candidate character string based on:
  - said one or more second values and the corresponding probabilities that the second values are related to the character set,
  - said frequency data; and
  - said candidate character strings.

12. The method of claim 11 wherein the third machine learning algorithm is a bag of words model.

13. The method of claim 11 wherein the candidate character strings correspond to city names or vendor names and the one or more second values correspond to country names.

14. A system comprising:
- one or more processors; and
- a non-transitory machine-readable medium storing a program executable by the processor, the program comprising sets of instructions for:
  - storing known values of a type of data to be extracted, wherein the known values comprise words, wherein each word comprising a plurality of characters;
  - receiving a character set;
  - determining a plurality of candidate character strings from the character set based on the known values using a first algorithm;
  - processing the character set using one or more first machine learning algorithms to produce a plurality of probabilities, the plurality of probabilities comprising probabilities that each character in the character set is a first character of one of the known values and probabilities that each character in the character set is a last character of one of the known values;
  - for each candidate character string, processing said probabilities that each character in the character set is a first character of one of the known values and said probabilities that each character in the character set is a last character of one of the known values as input features to a second machine learning algorithm to produce a plurality of likelihoods corresponding to the candidate character strings; and
  - selecting the characters corresponding to the candidate character string having the highest likelihood as the final character string.

15. The system of claim 14 wherein the first algorithm is a search algorithm comprising a Aho-Corasick trie structure configured with the plurality of known word values to receive the character set and a plurality of known word values stored in a database and produce the candidate character strings.

16. The system of claim 14 wherein the plurality of probabilities further comprising probabilities that each character in the character set belongs to one of the known values, the method further comprising:
- for each candidate character string, determining an average probability that the characters belong to one of the known values; and
- processing the average probability that the characters belong to one of the known values as one of said input features to the second machine learning algorithm to produce said plurality of likelihoods for each candidate character string.

17. The system of claim 14 further comprising:
- determining a conditional probability for each candidate character string, wherein the conditional probability corresponds to a likelihood of a particular candidate character string being a correct character string given a particular second value related to the character set as a whole; and
- for each candidate character string, processing the conditional probability for each candidate character string as one of said input features to the second machine learning algorithm to produce said plurality of likelihoods for each candidate character string.

18. A non-transitory machine-readable medium storing a program executable by at least one processor of a computer, the program comprising sets of instructions for:
- storing known values of a type of data to be extracted, wherein the known values comprise words, wherein each word comprising a plurality of characters;
- receiving a character set;
- determining a plurality of candidate character strings from the character set based on the known values using a first algorithm;
- processing the character set using one or more first machine learning algorithms to produce a plurality of probabilities, the plurality of probabilities comprising probabilities that each character in the character set is a first character of one of the known values and probabilities that each character in the character set is a last character of one of the known values;
- for each candidate character string, processing said probabilities that each character in the character set is a first character of one of the known values and said probabilities that each character in the character set is a last character of one of the known values as input features to a second machine learning algorithm to produce a plurality of likelihoods corresponding to the candidate character strings; and
- selecting the characters corresponding to the candidate character string having the highest likelihood as the final character string.

19. The non-transitory machine-readable medium of claim 18 wherein the plurality of probabilities further comprising probabilities that each character in the character set belongs to one of the known values, the method further comprising:
- for each candidate character string, determining an average probability that the characters belong to one of the known values; and
- processing the average probability that the characters belong to one of the known values as one of said input features to the second machine learning algorithm to produce said plurality of likelihoods for each candidate character string.

20. The non-transitory machine-readable medium of claim 18 further comprising:
- determining a conditional probability for each candidate character string, wherein the conditional probability corresponds to a likelihood of a particular candidate character string being a correct character string given a particular second value related to the character set as a whole; and
- for each candidate character string, processing the conditional probability for each candidate character string as one of said input features to the second machine learning algorithm to produce said plurality of likelihoods for each candidate character string.

* * * * *